United States Patent
Yakita et al.

(10) Patent No.: US 7,099,089 B2
(45) Date of Patent: Aug. 29, 2006

(54) ZOOM LENS CONTROL APPARATUS, ZOOM LENS SYSTEM, AND IMAGE-TAKING SYSTEM

(75) Inventors: Shin-ichiro Yakita, Tokyo (JP); Yasuyuki Tomita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 10/676,282

(22) Filed: Sep. 30, 2003

(65) Prior Publication Data

US 2004/0061949 A1 Apr. 1, 2004

(30) Foreign Application Priority Data

Sep. 30, 2002 (JP) ........................ 2002-287697
Feb. 3, 2003 (JP) ........................ 2003-025922

(51) Int. Cl.
*G02B 15/14* (2006.01)
*G03B 13/00* (2006.01)

(52) U.S. Cl. ................ 359/698; 348/347; 359/697
(58) Field of Classification Search ............... 348/345, 348/347, 353, 354; 359/694, 696–698; 396/79–82
See application file for complete search history.

(56) References Cited

U.S. PATENT DOCUMENTS

| | | | |
|---|---|---|---|
| 4,735,494 A | 4/1988 | Makino et al. | |
| 4,885,600 A | 12/1989 | Iwasa et al. | |
| 4,920,420 A | 4/1990 | Sano et al. | |
| 4,998,124 A | 3/1991 | Ishida et al. | |
| 5,144,491 A | 9/1992 | Ushiro et al. | |
| 5,486,860 A | 1/1996 | Shiokawa et al. | |
| 5,600,372 A | * 2/1997 | Cha | ............ 348/345 |
| 5,758,206 A | 5/1998 | Imaoka | |
| 6,115,552 A | * 9/2000 | Kaneda | ............ 396/82 |

FOREIGN PATENT DOCUMENTS

| | | |
|---|---|---|
| EP | 0485163 A2 | 5/1992 |
| JP | 04042108 A * | 2/1992 |
| JP | 07-154667 | 6/1995 |
| JP | 11-127376 | 5/1999 |
| JP | 2000121911 A * | 4/2000 |

OTHER PUBLICATIONS

Canon Inc. Lens Product Group, "EF Lens Work III, The Eyes of EOS"; Apr. 2003, Second Edition, Japan.

* cited by examiner

*Primary Examiner*—David N. Spector
(74) *Attorney, Agent, or Firm*—Morgan & Finnegan, LLP

(57) ABSTRACT

A control apparatus of a zoom lens is disclosed which automatically and accurately performs flange focal distance adjustment with a simple structure in a zoom lens of a rear focus type. The control apparatus comprises a memory which stores in-focus position data of a second lens unit with respect to the position of a first lens unit which provides variable magnification. A controller sets a reference position of the second lens unit for position control of the second lens unit with the in-focus position data based on an in-focus position of the second lens unit for an object at anywhere from the minimum object distance to the infinite distance when the first lens unit is located at the wide-angle end.

15 Claims, 9 Drawing Sheets

ZOOM LENS CONTROL APPARATUS, ZOOM LENS SYSTEM, AND IMAGE-TAKING SYSTEM

BACKGROUND OF THE INVENTION

1. Field of the Invention

The present invention relates to a zoom lens control apparatus, a zoom lens system, and an image-taking system which uses the zoom lens control apparatus.

2. Description of Related Art

When a zoom lens is mounted on a television camera or a video camera, it is necessary to adjust a flange focal distance to match the position of an image plane to the position of the image-pickup device (such as a CCD) of the camera. The flange focal distance means a distance from a plane of the camera (a flange plane) on which the zoom lens is mounted, to the image plane of the zoom lens.

If the flange focal distance deviates from an appropriate value, disadvantages occur such as an image blur caused from zooming even when an image of a stationary object is taken. Especially in a zoom lens apparatus of a rear focus type which achieves focusing by a lens located on the side of a stop (diaphragm) closer to an image plane, a data table which includes a moving track of the rear focus lens on an optical axis (a zoom tracking curve) is previously stored in a memory for each object distance such that an in-focus state can be maintained by moving the rear focus lens in electric synchronization with zooming.

In such a zoom lens of the rear focus type, the flange focal distance needs to be adjusted to match a reference position in the data table to the position of the rear focus lens in order to allow accurate focusing.

Japanese Patent Application Laid-Open No. H7-154667 (No. 1995-154667) has proposed a method of adjusting a flange focal distance by finding an inflection point of a zoom tracking curve as described above and then determining the positions of the wide-angle end and the telephoto end.

Japanese Patent Application Laid-Open No. H12-121911 (No. 2000-121911) has proposed a method of adjusting a flange focal distance in a lens system of a type with no inflection point on a zoom tracking curve as described above. Specifically, when a lens for varying the magnification is located at the designed wide-angle end and the designed telephoto end, focus positions are found at the respective zoom positions through automatic focusing control to determine actual adjustment values in a zoom direction and a focus direction from a previously prepared table.

Japanese Patent Application Laid-Open No. H11-127376 (No. 1999-127376) has proposed a method of automating adjustment of a flange focal distance in a zoom lens apparatus of a front focus type in which a focus lens and a back focal distance adjusting lens can be electrically driven to perform automatic focusing control.

In the flange focal distance adjusting methods proposed in Japanese Patent Application Laid-Open No. H7-154667 and No. 2000-121911, however, an appropriate object must be disposed at a specific distance in adjusting the flange focal distance. This places a restriction on the flange focal distance adjustment at the site of image-taking, and in addition, the accuracy of the flange focal distance adjustment may be reduced if the actual object distance deviates from the specific distance.

In the flange focal distance adjusting method proposed in Japanese Patent Application Laid-Open No. H11-127376, each of the focus lens and the back focal distance adjusting lens needs to be electrically driven. In addition, it is necessary to construct a system which allows automatic focus detection for each of the lenses, so that the resulting system has a complicated structure.

SUMMARY OF THE INVENTION

It is an object of the present invention to provide a zoom lens control apparatus which can automatically and accurately achieve flange focal distance adjustment with a simple structure by using an object at an arbitrary distance in a zoom lens of a rear focus type, a zoom lens system, and an image-taking system which have the zoom lens control apparatus.

According to one aspect of the present invention, a control apparatus controls a zoom lens including, in order from an object side, a first lens unit which moves for varying the magnification, a light amount adjusting unit which adjusts a light amount, and a second lens unit which moves for focusing. The zoom lens is mountable on a camera. The control apparatus comprises a memory which stores in-focus position data of the second lens unit with respect to a position of the first lens unit, and a controller which controls a position of the second lens unit with respect to a position of the first lens unit based on the in-focus position data. The controller sets a reference position of the second lens unit for position control of the second lens unit with the in-focus position data based on an in-focus position of the second lens unit for an object at anywhere from a minimum object distance to an infinite distance when the first lens unit is located at a wide-angle end.

According to another aspect of the present invention, a control apparatus controls a zoom lens including, in order from an object side, a first lens unit which moves for varying the magnification, a light amount adjusting unit which adjusts a light amount, and a second lens unit which moves for focusing. The zoom lens is mountable on a camera. The control apparatus comprises a memory which stores in-focus position data of the second lens unit with respect to a position of the first lens unit, and a controller which controls a position of the second lens unit with respect to a position of the first lens unit based on the in-focus position data. The controller sets a reference position of the second lens unit for position control of the second lens unit with the in-focus position data based on a difference between in-focus positions of the second lens unit for an object at anywhere from a minimum object distance to an infinite distance when the first lens unit is located at a wide-angle end and for the object when the first lens unit is located at a predetermined focal length position other then the wide-angle end.

According to another aspect of the present invention, a control apparatus controls a zoom lens including, in order from an object side, a first lens unit which moves for varying the magnification, a light amount adjusting unit which adjusts a light amount, and a second lens unit which moves for focusing. The zoom lens is mountable on a camera. The control apparatus comprises a memory which stores in-focus position data of the second lens unit with respect to a position of the first lens unit, and a controller which controls a position of the second lens unit with respect to a position of the first lens unit based on the in-focus position data. The controller sets a reference position of the second lens unit for position control of the second lens unit with the in-focus position data based on a difference between in-focus positions of the second lens unit for an object at anywhere from a minimum object distance to an infinite distance when the first lens unit is located at least two predetermined focal length positions.

The in-focus position data refers to data about positions to which the second lens unit should be moved to maintain an in-focus state in response to a positional change of the first lens unit and is typified by a zoom tracing curve.

The reference position refers to a position of the second lens unit corresponding to a base point (a reference point) of the in-focus position data.

These and other characteristics of the zoom lens control apparatus, the zoom lens system, and the image-taking system according to the present invention will be apparent from the following description of specific embodiments with reference to the drawings.

DETAILED DESCRIPTION OF THE PREFERRED EMBODIMENTS

Preferred embodiments of the present invention are hereinafter described with reference to the drawings.
Embodiment 1

Figure 1:
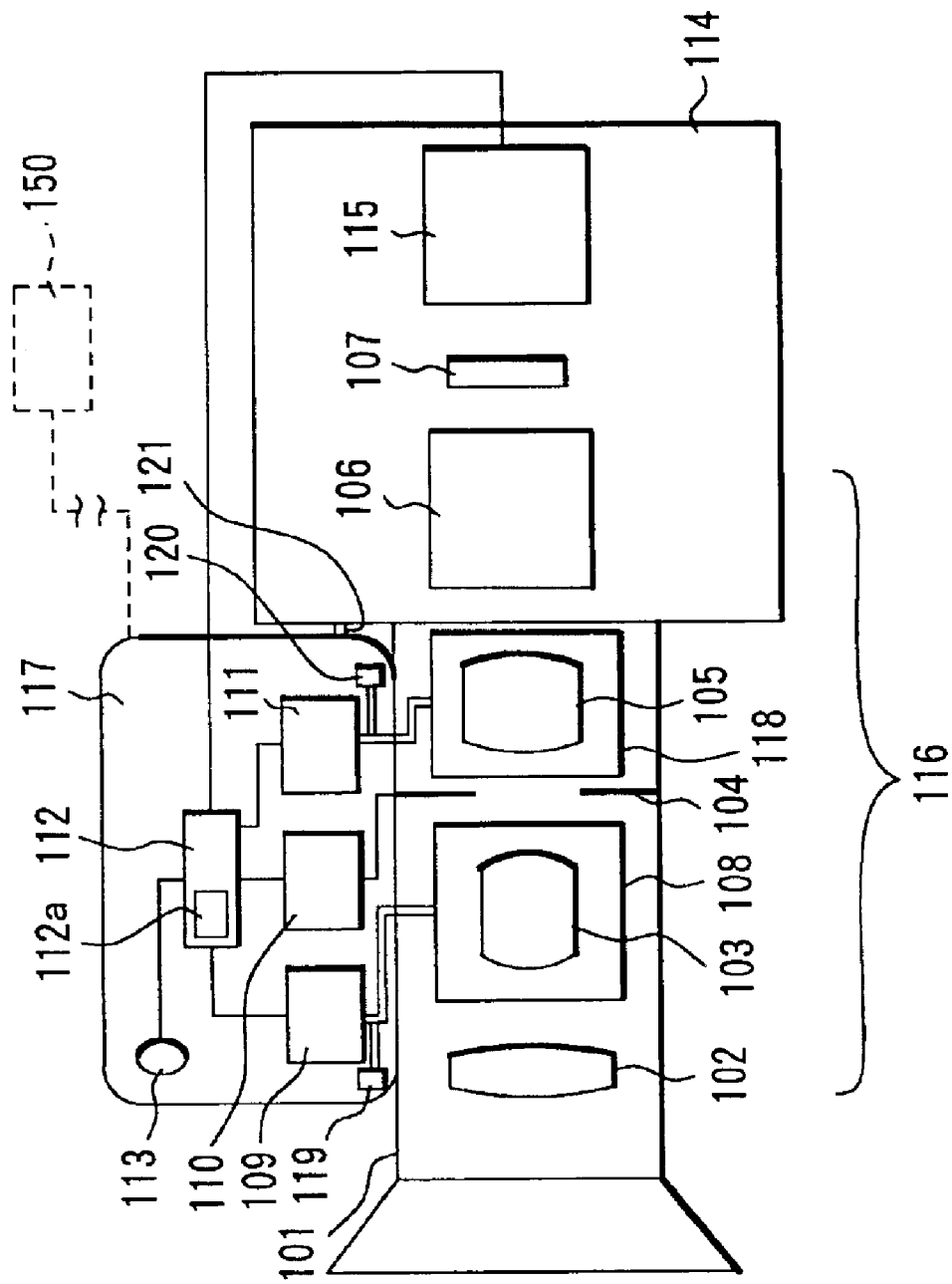
FIG. 1 is a schematic diagram showing the structure of an image-taking system which is Embodiment 1 of the present invention.

FIG. 1 shows the structure of an image-taking system which is Embodiment 1 of the present invention. In FIG. 1, reference numeral 114 shows a camera such as a television camera or a video camera. Reference numeral 101 shows an interchangeable zoom lens which can be mounted on the camera 114. Reference numeral 117 shows a drive unit (a control apparatus) mounted on the zoom lens 101. Reference numeral 116 shows the image-taking system comprising the camera 114, zoom lens 101 and drive unit 117. The zoom lens 101 and the drive unit 117 constitute a zoom lens system.

The zoom lens system is formed to receive power supply through a cable 121 which connects the camera 114 with the drive unit 117 (or a contact connector connected when the zoom lens 101 is coupled to the camera 114). The zoom lens system may receive power supply from an outside power supply unit 150.

In the zoom lens 101, reference numeral 102 shows a lens unit which is fixed or movable in an optical axis direction for manual focusing. Reference numeral 103 shows a variator lens unit (a first lens unit) which is movable in the optical axis direction to vary the magnification. Reference numeral 104 shows a diaphragm unit (a light amount adjusting unit) which changes the diameter of an aperture to adjust a light amount passing therethrough. Reference numeral 105 shows a focus lens unit (a second lens unit) which is movable in the optical axis direction for automatic focusing. These lens units 102 to 105 and the diaphragm unit 104 constitute an image-taking optical system. This zoom lens is of a rear focus type.

Reference numeral 108 shows a zoom driving mechanism such as a cam which drives the variator lens unit 103 in the optical axis direction. Reference numeral 118 shows a focus driving mechanism such as a screw which drives the focus lens unit 105 in the optical axis direction.

The zoom driving mechanism 108, the focus driving mechanism 118, and the diaphragm unit 104 can be electrically driven by the drive unit 117 and manually driven, as later described.

On the other hand, in the camera 114, reference numeral 106 shows a glass block which corresponds to an optical filter or a color separation prism. Reference numeral 107 shows an image-pickup device such as a CCD or a CMOS sensor which photoelectrically converts an object image formed by the image-taking optical system. Reference numeral 115 shows a camera controller which is responsible for control of the camera 114 and contains a CPU (not shown) for performing various types of operational processing, an image processing circuit for performing various types of image processing on an image-pickup signal from the image-pickup device 107, and the like.

In the drive unit 117, reference numeral 112 shows a lens controller which controls various types of operations of the drive unit 117 and contains a CPU (not shown) for performing various types of operational processing, a data memory 112a for storing data tables including zoom tracking curves (in-focus position data), later described, and a driver (not shown) of a motor, later described.

The zoom tracking curve data represents positions to which the focus lens unit 105 should be moved to maintain an in-focus state of the zoom lens in response to a positional change in a moving range (that is, the entire zoom range) of the variator lens unit 103. In Embodiment 1, the data is stored in the data memory 112a as data about driving positions of the focus driving mechanism 118 (that is, the positions of the focus lens unit 105) with respect to driving positions of the zoom driving mechanism 108 (that is, the positions of the variator lens unit 103).

Now, description is made for the zoom tracking curve data and flange focal distance adjustment in Embodiment 1.

Figure 2:
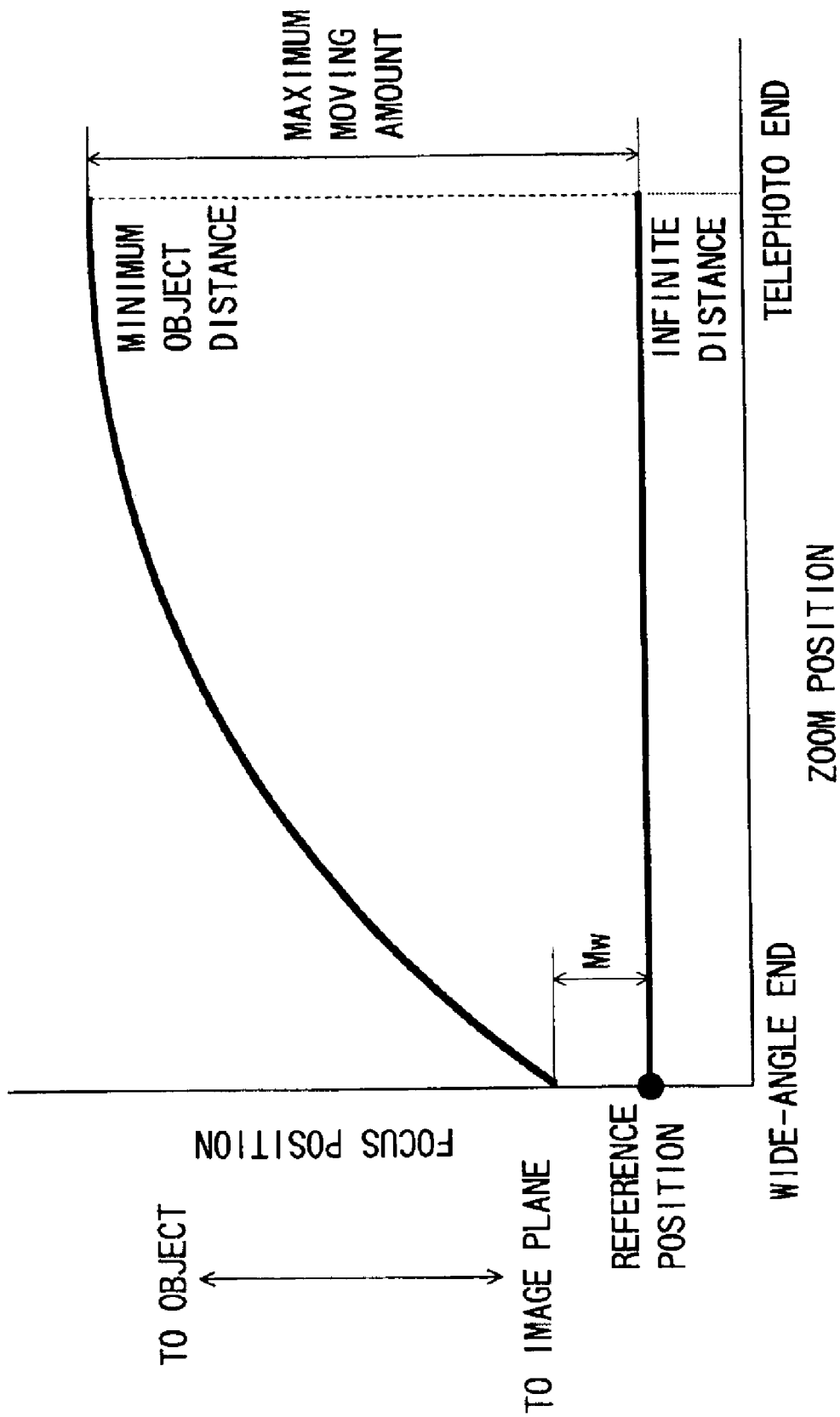
FIG. 2 shows zoom tracking curves stored in a drive unit forming part of the image-taking system of Embodiment 1.

FIG. 2 schematically shows the zoom tracking curve data. The horizontal axis in FIG. 2 represents the position of the variator lens unit 103 (the zoom position), while the vertical axis represents the position of the focus lens unit 105 (the focus position). FIG. 2 shows data at the minimum object distance and data at the infinite distance where the zoom lens 101 can achieve focusing.

The relationship among the zoom position and the object distance and the focus position represented by the zoom tracking curve data is the same at any camera on which the zoom lens 101 is mounted. However, when the zoom tracking curve data is used to actually perform control for maintaining an in-focus state in response to varied magnification in the zoom lens mounted on a particular camera, the zoom tracking curve data needs to be adapted to the flange focal distance of that camera.

In addition, the positional relationship between the position of the focus lens unit 105 (a reference position) corresponding to the position (base point) serving as a reference in the zoom tracking curve data and the image-pickup surface of the image-pickup device 107, that is, the flange focal distance, depends on the type of the camera on which the zoom lens 101 is mounted, variations in individual products, factors of the environment in which the image-taking system is used such as temperature and humidity. For this reason, each time the zoom lens is mounted on a different camera, or each time images are taken in a different use environment, and immediately after the power is turned on, it is necessary to adjust the flange focal distance by determining the reference position of the focus lens unit 105 with respect to the base point in the zoom tracking curve data to make the zoom tracking curve data suitable for the flange focal distance of the camera.

To this end, in Embodiment 1, the driving mechanism realized by the cam or the like is used in the zoom lens 101 in which the position of the variator lens unit 103 on the optical axis is established at the wide-angle end. The focus lens unit 105 is driven at the wide-angle end to achieve automatic focusing. Thus, the reference position of the focus lens unit 105 achieving focusing at the wide-angle end is matched to the end point (the base point) at the wide-angle end in the zoom tracking curve data.

As seen from FIG. 2, when the zoom position is at the wide-angle end, the focus position to achieve focusing for an object at the infinite distance is not greatly different from the focus position for an object at the minimum object distance. When the zoom position is at the telephoto end, however, the focus position to achieve focusing for an object at the infinite distance is significantly different from the focus position for an object at the minimum object distance.

In other words, the absolute value of the difference between the in-focus position of the focus lens unit 105 for an object at the infinite distance and the in-focus position of the focus lens unit 105 for an object at the minimum object distance which can be brought into focus over the entire zoom range is generally proportional to the square of the focal length and is at the minimum at the wide-angle end.

Thus, when the depth of focus of the image-taking system is at a certain value or larger, it can be thought that the in-focus position of the focus lens unit 105 at the wide-angle end for a stationary object at an arbitrary distance within the object distance range where focusing can be achieved over the entire zoom range, is substantially the same regardless of the object distance. That in-focus position can be set as the reference position of the focus lens unit 105 to simply and quickly perform flange focal distance adjustment.

Subsequently, the drive unit 117 is described. Reference numeral 109 shows a zoom motor which is activated in response to a drive signal from the lens controller 112 to drive the zoom driving mechanism 108 in the zoom lens 101. Reference numeral 111 shows a focus motor which is activated in response to a drive signal from the lens controller 112 to drive the focus driving mechanism 118 in the zoom lens 101.

The drive unit 117 has a zoom position detector 119 such as an encoder or a potentiometer, which is connected to the zoom driving mechanism 108 to detect the driving position of the zoom driving mechanism 108 (that is, to detect the zoom position). The lens controller 112 controls the focus motor 111 based on a detection signal from the zoom position detector 119 and the zoom tracking curve data. In this manner, an in-focus state is automatically maintained over the entire zoom range. The drive unit 117 also has a focus position detector 120 such as an encoder and a photosensor which is connected to the focus driving mechanism 118 to detect the driving position of the focus driving mechanism 118 (that is, to detect the position of the focus lens unit 105).

Reference numeral 110 shows a diaphragm driving circuit which drives the diaphragm unit 104 in the zoom lens 101 in response to a driving signal from the lens controller 112.

Reference numeral 113 shows a flange focal distance adjustment switch which is operated by a user to give an instruction to perform flange focal distance adjustment operation. An operation signal from the switch 113 is input to the lens controller 112.

The flange focal distance adjustment is performed in the image-taking system 116 with the following procedure.

(1) First, the image-taking system 116 is disposed such that it faces a high-contrast object (a substance) such as a Siemens star chart and it is placed at an arbitrary distance from the object where focusing can be achieved over the entire zoom range of the zoom lens 101.

(2) The diaphragm unit 104 is set to the full aperture. This causes a small depth of focus to allow accurate flange focal distance adjustment for enhancing the accuracy of automatic focusing. In addition, the variator lens unit 103 is disposed at the wide-angle end.

(2)' At this point, the lens unit 102 is fixed at a predetermined position when the lens unit 102 is movable for manual focusing. This can reduce a burden on an operator because of the simpler operation as compared with the conventional flange focal distance adjustment realized by several repetitive focusing actions by the lens unit 102 at the telephoto end and by the focus lens unit 105 at the wide-angle end.

(3) The focus lens unit 105 is driven by automatic focusing control to bring the object into focus. The position of the focus lens unit 105 at this point (the in-focus position) is determined as the reference position for subsequent positional control of the focus lens unit 105 with the zoom tracking curve data. The determined reference position is stored in the data memory 112a or another memory, not shown. In this manner, the reference position setting or the flange focal distance adjustment is completed.

The steps (2) and (3) can be automatically performed by the lens controller 112 upon reception of an operation signal from the flange focal distance adjustment switch 113.

Alternatively, after a user performs the steps (1) and (2) (and the step (2)'), the lens controller 112 may automatically perform the step (3) upon reception of an operation signal from the flange focal distance adjustment switch 113.

The lens controller 112 may automatically perform steps (2) and (3) when the power is turned on.

Alternatively, whether a flange focal distance has been adjusted or not may be automatically checked when the power is turned on, and the flange focal distance may be automatically adjusted only if a displacement is detected.

In the step (3), the lens controller 112 may receive an image-pickup signal from the image-pickup device 107 through the camera controller 115 to determine whether or not focusing is achieved by using the received image-pickup signal through a so-called contrast detection method (a television AF method) or a phase difference detection method. The determination result is relied on to detect the in-focus position of the focus lens unit 105. Alternatively, the lens controller 112 may receive the result of focusing determination performed by the camera controller 115 to detect the in-focus position of the focus lens unit 105.

Figure 3:
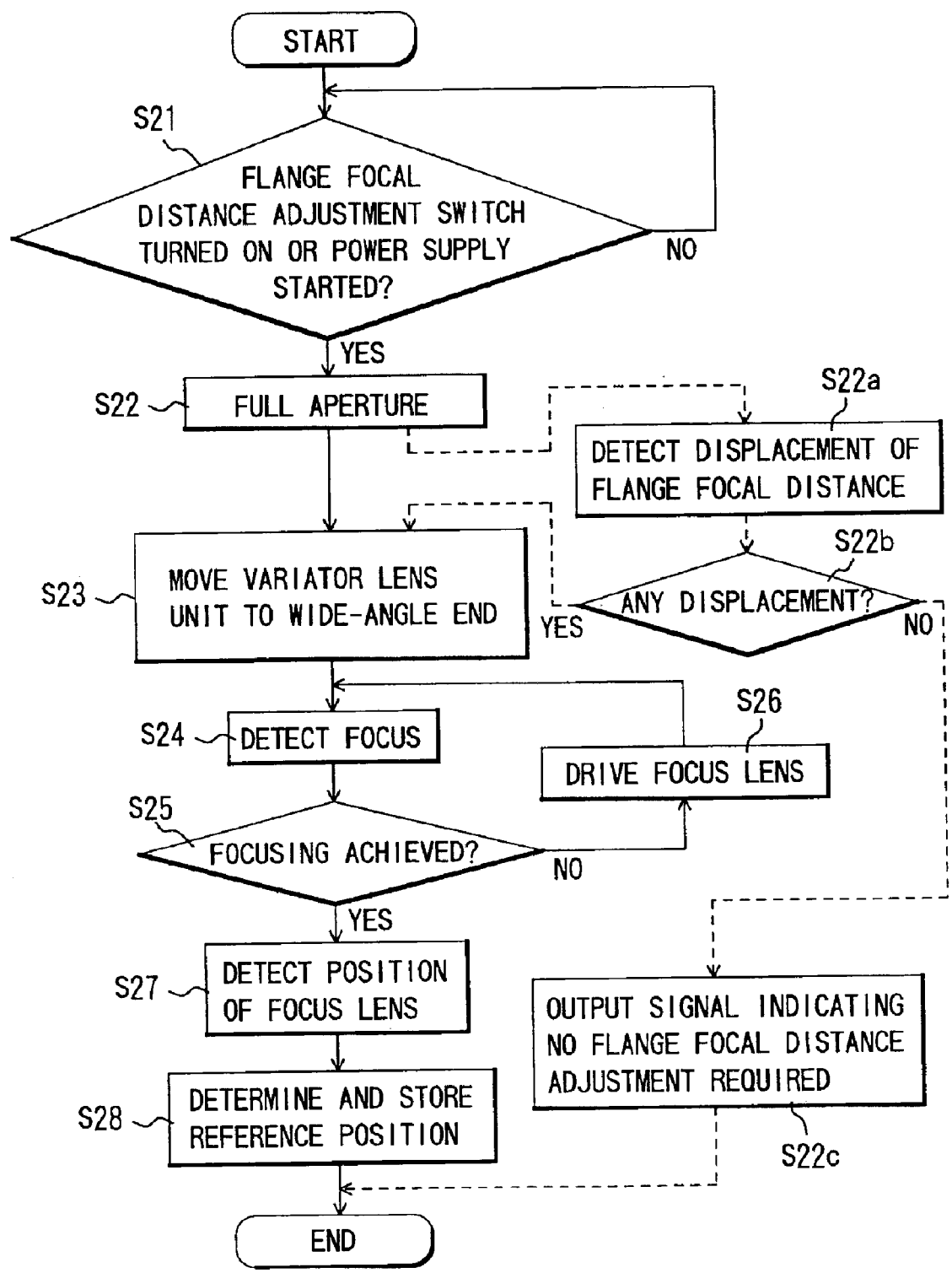
FIG. 3 is a flow chart showing control operation of flange focal distance adjustment of a zoom lens performed by the drive unit of Embodiment 1.

FIG. 3 is a flow chart showing the operation of the lens controller 112 when the lens controller 112 automatically performs the steps (2) and (3).

First, at step (abbreviated as "S" in FIG. 3) 21, the lens controller 112 determines whether or not an on-signal is input thereto from the flange focal distance adjustment switch 113 or whether or not power supply thereto is started from the camera 114 or from the outside power supply unit 150. If such an on-signal is input or power supply is started, the flow proceeds to step 22 and the lens controller 112 drives the diaphragm unit 104 to the full aperture (2).

In the case where power supply is started, after step 22, the presence or absence of a displacement of the reference position (the flange focal distance) may be automatically detected as shown by a dotted line in FIG. 3 (step 22a). Specifically, the variator lens unit 103 is moved to the wide-angle end, and the focus lens unit 105 is moved to a reference position determined in the preceding adjustment and stored in the data memory 112a or the other memory. If a video signal of an arbitrary object has a signal strength smaller than a predetermined threshold, focusing operation is performed. When the focusing operation results in a higher signal strength, it is determined that the reference position is displaced from the position stored previously (step 22b), and the flow proceeds to step 23. When the focusing operation does not result in a higher signal strength, the lens controller 112 outputs a signal for a display indicating that no flange focal distance adjustment is required (step 22c).

Next, at step 23, the lens controller 112 drives the zoom motor 109 to move the variator lens unit 103 to the wide-angle end (2).

Next, at step 24, the lens controller 112 performs detection of a focusing state (focus detection) of the image-taking taking optical system based on an image-pickup signal received from the camera controller 115 through the contrast detection method or the like (3). In the case of the contrast detection method, the lens controller 112 extracts high-frequency components of the image-pickup signal and repeatedly moves the focus lens unit 105 by driving the focus motor 111 and detects focus until the level of the extracted high-frequency components reaches the maximum (until it is determined that focusing is achieved at step 25).

In the case of the phase difference detection method, the lens controller 112 compares two image-pickup signals produced by taking images of the same portion of the object to derive a defocus amount from the phase difference between the two images presented by the image-pickup signals. If the defocus amount is out of an in-focus range (step 26), the lens controller 112 calculates the position of the focus lens unit 105 where focusing is achieved (the driving amount of the focus motor 111) to drive the focus lens unit 105.

If it is determined that focusing is achieved after step 25, the flow proceeds to step 27. The lens controller 112 detects the position of the focus lens unit 105 at this point (the driving position of the focus driving mechanism 118) by the focus position detector 120 described above (3).

At step 28, the lens controller 112 determines the position of the focus lens unit 105 detected at step 27 (the driving position of the focus driving mechanism 118) as the reference position and stores the position in the data memory 112a or the other memory (3).

In this event, the lens controller 112 may compare the reference position stored as the result of the preceding flange focal distance adjustment with the reference position newly obtained at step 28, and if a displacement is found between them, the lens controller 112 may automatically rewrite the reference position newly obtained at step 28 into the data memory 112a or the other memory, or a circuit may be provided to give an instruction to execute such a rewrite with a display or the like.

While Embodiment 1 has been described for the case where the drive unit 117 is mounted on the zoom lens 101 to constitute the zoom lens system, the present invention is applicable to a zoom lens system which has a component corresponding to the drive unit 117 contained in a zoom lens body.

Figure 4:
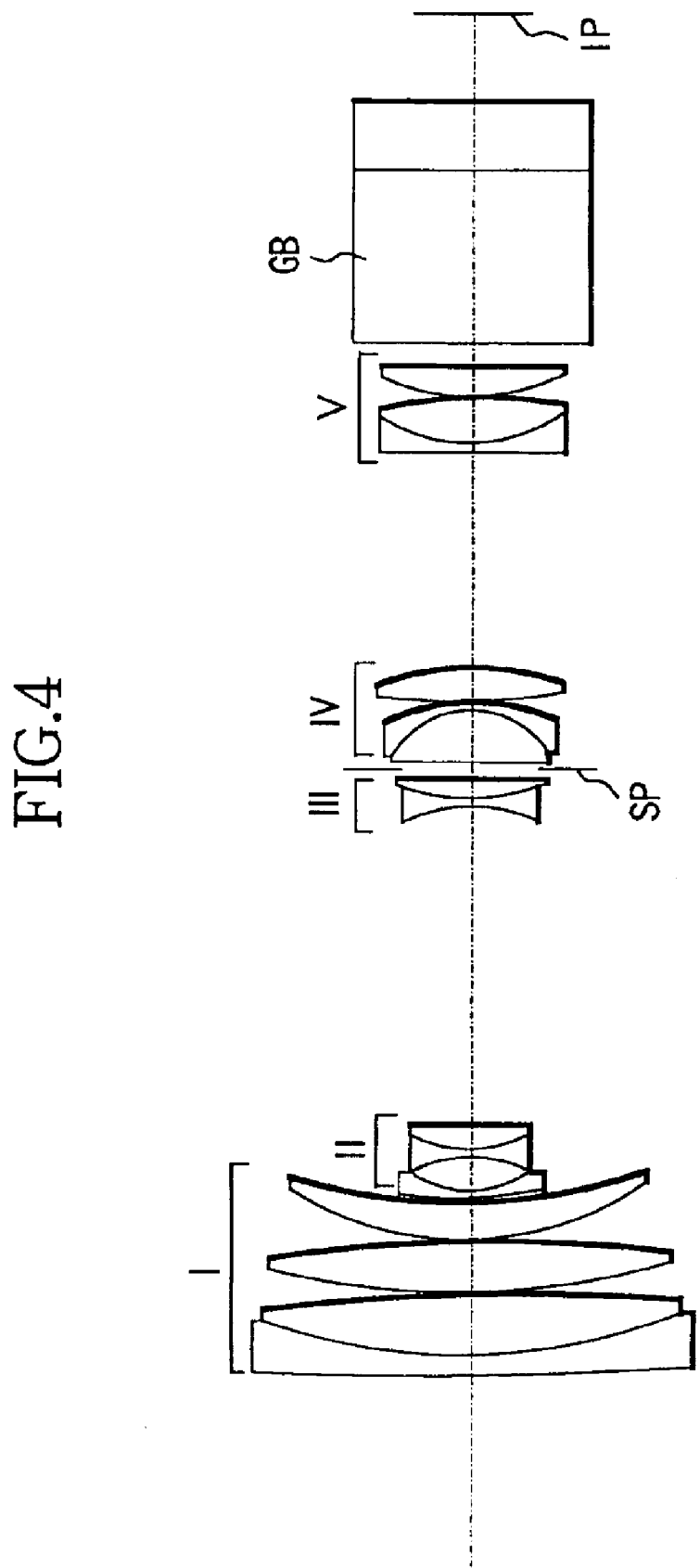
FIG. 4 shows the optical structure of a zoom lens of Numerical Example 1 of the present invention.

In the following, an example of the zoom lens to which the flange focal distance adjustment control described in Embodiment 1 is applicable is illustrated. In FIG. 4, in order from an object side, I shows a lens unit for manual focusing, II shows a variator lens unit (a first lens unit) movable for varying the magnification, III shows a correction lens unit for correcting a moved image-forming position when magnification is varied, IV shows a fixed lens unit, V shows a focus lens unit (a second lens unit) for automatic focusing, GB shows a glass block such as a color separation prism, SP shows a stop (diaphragm), and IP shows an image-forming position (the position of the image plane). The lens unit I and the fixed lens unit IV are stationary when magnification is varied. Flange focal distance adjustment is realized by achieving focusing with the focus lens unit V.

Table 1 shows Numerical Example 1 of the zoom lens shown in FIG. 4. In Table 1, i represents an i-th optical surface in order from the object side, d an air spacing between an i-th optical surface and an (i+1)-th optical surface, ni the refractive index of an i-th optical surface (glass material), vi the Abbe number of an i-th optical surface (glass material), and f the focal length of the entire system, fno an F number, and ω half of the field angle.

| f = 7.60–111.49 | fno = 1:1.52–1:2.32 | 2ω = 55.5–4.1 | |
|---|---|---|---|
| r1 = 1169.451 | d1 = 2.40 | n1 = 1.81265 | v1 = 25.4 |
| r2 = 98.429 | d2 = 10.83 | n2 = 1.51625 | v2 = 64.2 |
| r3 = −265.170 | d3 = 0.20 | n3 = 1.60548 | v3 = 60.7 |
| r4 = 124.037 | d4 = 8.29 | | |
| r5 = −281.395 | d5 = 0.20 | | |
| r6 = 51.797 | d6 = 6.46 | n4 = 1.64254 | v4 = 60.1 |
| r7 = 97.915 | d7 = variable | | |
| r8 = 71.045 | d8 = 0.90 | n5 = 1.82017 | v5 = 46.6 |
| r9 = 17.601 | d9 = 6.01 | | |
| r10 = −21.542 | d10 = 0.90 | n6 = 1.77621 | v6 = 49.6 |
| r11 = 10.397 | d11 = 4.63 | n7 = 1.85501 | v7 = 23.9 |
| r12 = −4295.134 | d12 = variable | | |
| r13 = −27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = variable | | |
| r16 = ∞ (stop) | d16 = 1.60 | | |
| r17 = 10000.000 | d17 = 8.10 | n10 = 1.61671 | v10 = 55.0 |
| r18 = −15.601 | d18 = 1.20 | n11 = 1.82017 | v11 = 46.6 |
| r19 = −37.306 | d19 = 0.20 | | |
| r20 = 110.820 | d20 = 5.22 | n12 = 1.62508 | v12 = 53.2 |
| r21 = −51.132 | d21 = variable | | |
| r22 = 786.500 | d22 = 1.20 | n13 = 1.81264 | v13 = 25.4 |
| r23 = 25.913 | d23 = 7.96 | n14 = 1.66152 | v14 = 50.9 |
| r24 = −77.604 | d24 = 0.20 | | |
| r25 = 37.803 | d25 = 5.34 | n15 = 1.66152 | v15 = 50.9 |
| r26 = −1000.000 | d26 = variable | | |
| r27 = ∞ | d27 = 29.00 | n16 = 1.60718 | v16 = 38.0 |
| r28 = ∞ | d28 = 11.20 | n17 = 1.51825 | v17 = 64.2 |
| r29 = ∞ | | | |

-continued

| f = 7.60–111.49 | fno = 1:1.52–1:2.32 | 2ω = 55.5–4.1 | |
|---|---|---|---|
| FOCAL LENGTH VARIABLE SPACING | 7.60 | 29.11 | 111.49 |
| d7 | 0.39 | 33.92 | 49.55 |
| d12 | 52.91 | 14.80 | 3.78 |
| d15 | 1.55 | 6.13 | 1.53 |
| d21 | 37.00 | 37.00 | 37.00 |
| d26 | 3.80 | 3.80 | 3.80 |

NUMERICAL EXAMPLE 1

In Numerical Example 1, the minimum object distance at which focusing can be achieved over the entire zoom range is 432 mm from the front surface of the zoom lens.

As seen from FIG. 2, the moving range for focusing is the smallest at the wide-angle end and the largest at the telephoto end. Thus, it can be said that an object distance at which focusing can be achieved at the telephoto end is an object distance (a substance distance) at which focusing can be achieved over the entire zoom range. When the closest object distance at which focusing can be achieved over the entire zoom range is defined as the minimum object distance, Embodiment 1 is extremely effective for an object at a distance falling within the range between the zoom tracking curves of the infinite distance and the minimum object distance. It is desirable to determine whether or not an object placed at an arbitrary distance can be brought into focus at the telephoto end to decide the accuracy of flange focal distance adjustment. If focusing cannot be achieved, warning operation may be performed such as output or display of a signal indicating that flange focal distance adjustment cannot be performed.

When the permissible circle of confusion of a camera (the image-taking apparatus) is represented by $\epsilon$, and the full F number at the wide-angle end is represented by F, the depth of focus $\delta$ is generally represented by:

$$\delta = \epsilon F$$

The absolute value of sensitivity of the focus lens unit V to a back focal distance is defined as s, in other words, s represents amount of displacement of an image-forming position in the optical axis direction during movement of the second lens unit by a predetermined amount in the optical axis direction. For example, in the case where s is 1 mm as shown in table 2, when the focus lens unit is moved by 1 mm in the optical axis direction, the amount of displacement of the image-forming position in the optical axis direction is 1 mm. A moving amount m of the focus lens unit V required to displace the back focal distance by the depth of focus $\delta$ is represented by:

$$m = \epsilon F/|s|$$

When a difference between the in-focus position of the focus lens unit V for an object at the infinite distance and the in-focus position for an object at the minimum object distance is represented by Mw, a displacement of the reference position is recognized as an image blur at some object distances to require more accurate adjustment of the flange focal distance if the value m is smaller than the value |Mw|.

From the above, a restrictive condition set in Embodiment 1 to define the need for correction of the reference position can be expressed by:

$$2\epsilon F/|s| \leq |Mw| \quad (1)$$

When the expression (1) is satisfied, the in-focus position of the focus lens unit V at the wide-angle end can be corrected and defined as the reference position to perform more accurate flange focal distance adjustment. Next, Table 2 shows the relationship between the values of the respective parameters in Numerical Example 1 and the expression (1).

TABLE 2

| E | F | s | $m = \frac{\epsilon F}{|s|}$ | $\frac{2\epsilon F}{|s|}$ | Mw |
|---|---|---|---|---|---|
| 0.016 | 1.52 | 1 | 0.024 | 0.049 | −0.122 |

(unit mm)

It can be seen from Table 2 that, if the automatic in-focus position at the wide-angle end is simply stored as the reference position in Numerical Example 1, a displacement from the true reference position may be recognized in an image at some object distances from the aforementioned reason.

Next, description is made for a method of correcting the reference position of the focus lens unit V. Table 3 shows a list of a division position $m_{Wi}$ determined by dividing Mw by m into i, an object distance $obj_i$ at which focusing is achieved when the focus lens unit V is located at the division position $m_{Wi}$, and an in-focus position $m_{Ti}$ of the focus lens unit V at the telephoto end for the object distance $obj_i$. The object distance $obj_i$ is determined relative to the front surface of the zoom lens, and $m_{Wi}$ and $m_{Ti}$ are determined relative to the true reference position of the focus lens unit V.

For positive and negative signs, the positive sign indicates a position closer to the image plane. Table 3 also shows the difference between the in-focus position $m_{Wi}$ at the wide-angle end and the in-focus position $m_{Ti}$ at the telephoto end for the object distance $obj_i$, represented by:

$$|m_{Ti} - m_{Wi}| = m_{W,Ti}.$$

TABLE 3

| DIVISION POSITION $m_{Wi}$ | $m_{W1}$ m −0.024 | $m_{W2}$ 2 m −0.049 | $m_{W3}$ 3 m −0.073 | $m_{W4}$ 4 m −0.097 | $M_{W5}$ 5 m −0.122 |
|---|---|---|---|---|---|
| OBJECT DISTANCE $obj_i$ | $Obj_1$ −2366 | $Obj_2$ −1138 | $Obj_3$ −750 | $Obj_4$ −554 | $Obj_5$ −432 |
| IN-FOCUS POSITION AT TELEPHOTO END $m_T$ | $m_{T1}$ −4.274 | $m_{T2}$ −7.488 | $m_{T3}$ −9.888 | $m_{T4}$ −11.852 | $m_{T5}$ −13.569 |
| DIFFERENCE BETWEEN IN-FOCUS POSITIONS $m_{W,Ti}$ | $m_{W,T1}$ 4.250 | $m_{W,T2}$ 7.439 | $m_{W,T3}$ 9.815 | $m_{W,T4}$ 11.755 | $m_{W,T5}$ 13.447 |

(unit mm)

In Table 3, a displacement of the focus lens unit V is not recognized as an image blur in each area defined as the division position $m_{Wi}$. Thus, the flange focal distance adjustment can be achieved more accurately by correcting the reference position with respect to the automatic in-focus position (in-focus position obtained by automatic focusing control) at the wide-angle end by a predetermined amount for each area. Table 4 shows each range of the difference $m_{W,Ti}$ between the in-focus positions and the corresponding correction amount of the automatic in-focus position at the wide-angle end. This data about the correction amount may be stored in the data memory 112a or the other memory for use in subsequent correction of the reference position.

TABLE 4

| RANGE OF $m_{W.Ti}$ | $0 \leq m_{W.T1} < 4.250$ | $4.250 \leq m_{W.T2} < 7.439$ | $7.439 \leq m_{W.T3} < 9.815$ | $9.815 \leq m_{W.T4} < 11.755$ | $11.755 \leq m_{W.T5} \leq 13.447$ |
|---|---|---|---|---|---|
| CORRECTION AMOUNT | 0 | m | 2 m | 3 m | 4 m |

(unit mm)

In this manner, the in-focus position at the wide-angle end is subjected to correction, and the corrected position is stored as the reference position of the focus lens unit V, thereby allowing more accurate flange focal distance adjustment.

While the correction amount of the in-focus position at the wide-angle end is determined (that is, the reference position is set) on the basis of the difference between the in-focus position at the wide-angle end and the in-focus position at the telephoto end in this case, the reference position may be determined on the basis of a difference between the in-focus position at the wide-angle end and an in-focus position at a predetermined zoom position. If such a predetermined zoom position other than the telephoto end is used, however, it is necessary to accurately know the position of the lens unit moving in varying the magnification on the optical axis at that zoom position, so that the positional relationship between that zoom position and either of the ends of the zoom (the wide-angle end or the telephoto end) needs to be stored previously.

Embodiment 2

Figure 5:
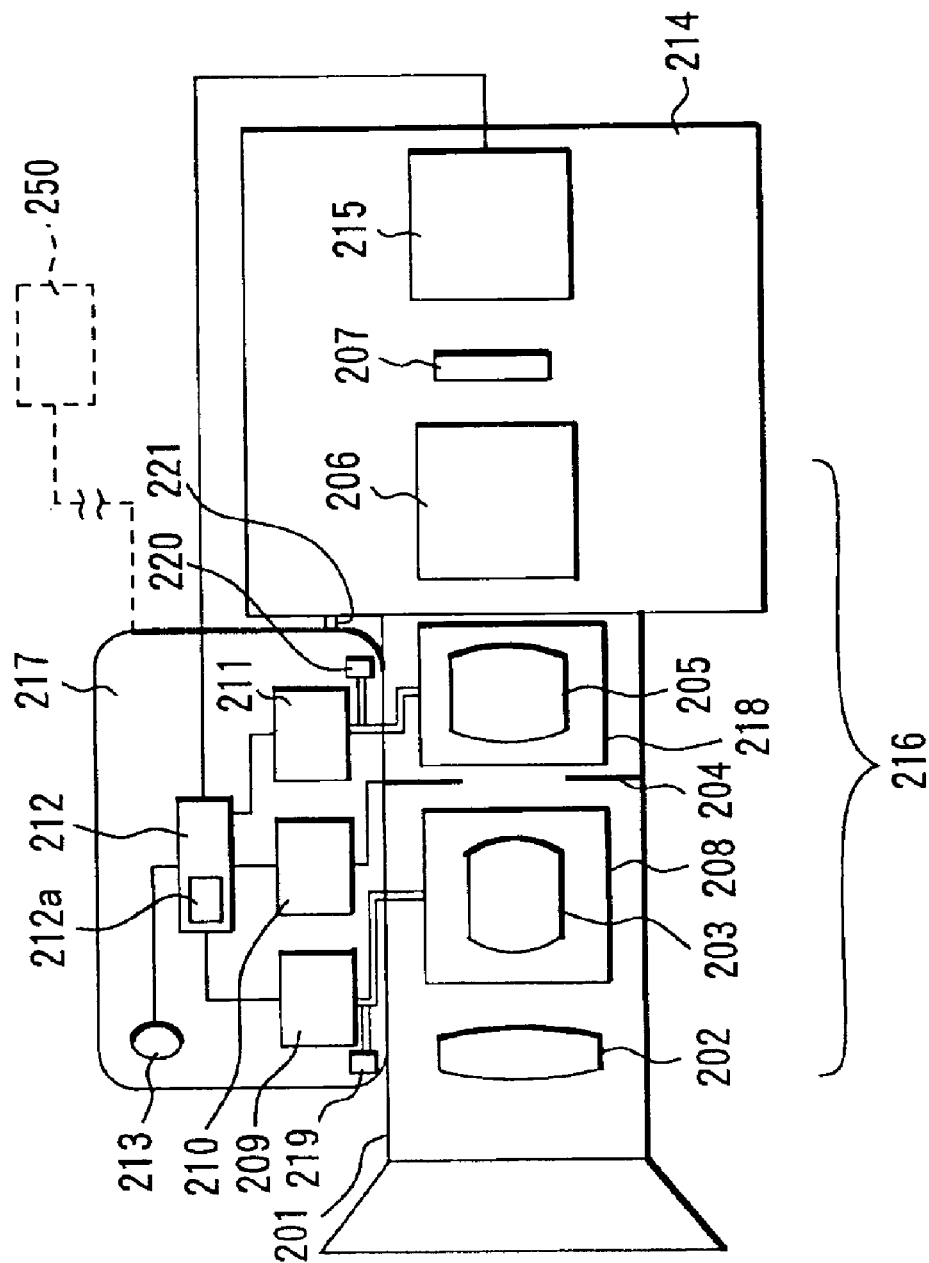
FIG. 5 is a schematic diagram showing the structure of an image-taking system which is Embodiment 2 of the present invention.

FIG. 5 shows the structure of an image-taking system which is Embodiment 2 of the present invention. In FIG. 5, reference numeral 214 shows a camera such as a television camera or a video camera. Reference numeral 201 shows an interchangeable zoom lens which can be mounted on the camera 214. Reference numeral 217 shows a drive unit (a control apparatus) mounted on the zoom lens 201. Reference numeral 216 shows the image-taking system. The zoom lens 201 and the drive unit 217 constitute a zoom lens system.

The zoom lens system is formed to receive power supply through a cable 221 which connects the camera 214 with the drive unit 217 (or a contact connector connected when the zoom lens 201 is coupled to the camera 214). The zoom lens system may receive power supply from an outside power supply unit 250.

In the zoom lens 201, reference numeral 202 shows a lens unit which is fixed or movable in an optical axis direction for manual focusing. Reference numeral 203 shows a variator lens unit (a first lens unit) which is movable in the optical axis direction to vary the magnification. Reference numeral 204 shows a diaphragm unit (stop: a light amount adjusting unit) which changes the diameter of an aperture to adjust a light amount passing therethrough. Reference numeral 205 shows a focus lens unit (a second lens unit) which is movable in the optical axis direction for automatic focusing. These lens units 202 to 205 and the diaphragm unit 204 constitute an image-taking optical system. This zoom lens is of a rear focus type.

Reference numeral 208 shows a zoom driving mechanism such as a cam which drives the variator lens unit 203 in the optical axis direction. Reference numeral 218 shows a focus driving mechanism such as a screw which drives the focus lens unit 205 in the optical axis direction.

The zoom driving mechanism 208, the focus driving mechanism 218, and the diaphragm unit 204 can be electrically driven by the drive unit 217 and manually driven, as later described.

On the other hand, in the camera 214, reference numeral 206 shows a glass block which corresponds to an optical filter or a color separation prism. Reference numeral 207 shows an image-pickup device such as a CCD or a CMOS sensor which photoelectrically converts an object image formed by the image-taking optical system. Reference numeral 215 shows a camera controller which is responsible for control of the camera 214 and contains a CPU (not shown) for performing various types of operational processing, an image processing circuit for performing various types of image processing on an image-pickup signal from the image-pickup device 207, and the like.

In the drive unit 217, reference numeral 212 shows a lens controller which controls various types of operations of the drive unit 217 and contains a CPU (not shown) for performing various types of operational processing, a data memory 212a for storing data tables including zoom tracking curves (in-focus position data), later described, and a driver (not shown) of a motor, later described.

The zoom tracking curve data represents positions to which the focus lens unit 205 should be moved to maintain an in-focus state of the zoom lens in response to a positional change in a moving range (that is, the entire zoom range) of the variator lens unit 203. In Embodiment 2, the data is stored in the data memory 112a as data about driving positions of the focus driving mechanism 218 (that is, the positions of the focus lens unit 205) with respect to driving positions of the zoom driving mechanism 208 (that is, the positions of the variator lens unit 203).

Now, description is made for the zoom tracking curve data and flange focal distance adjustment in Embodiment 2.

Figure 6:
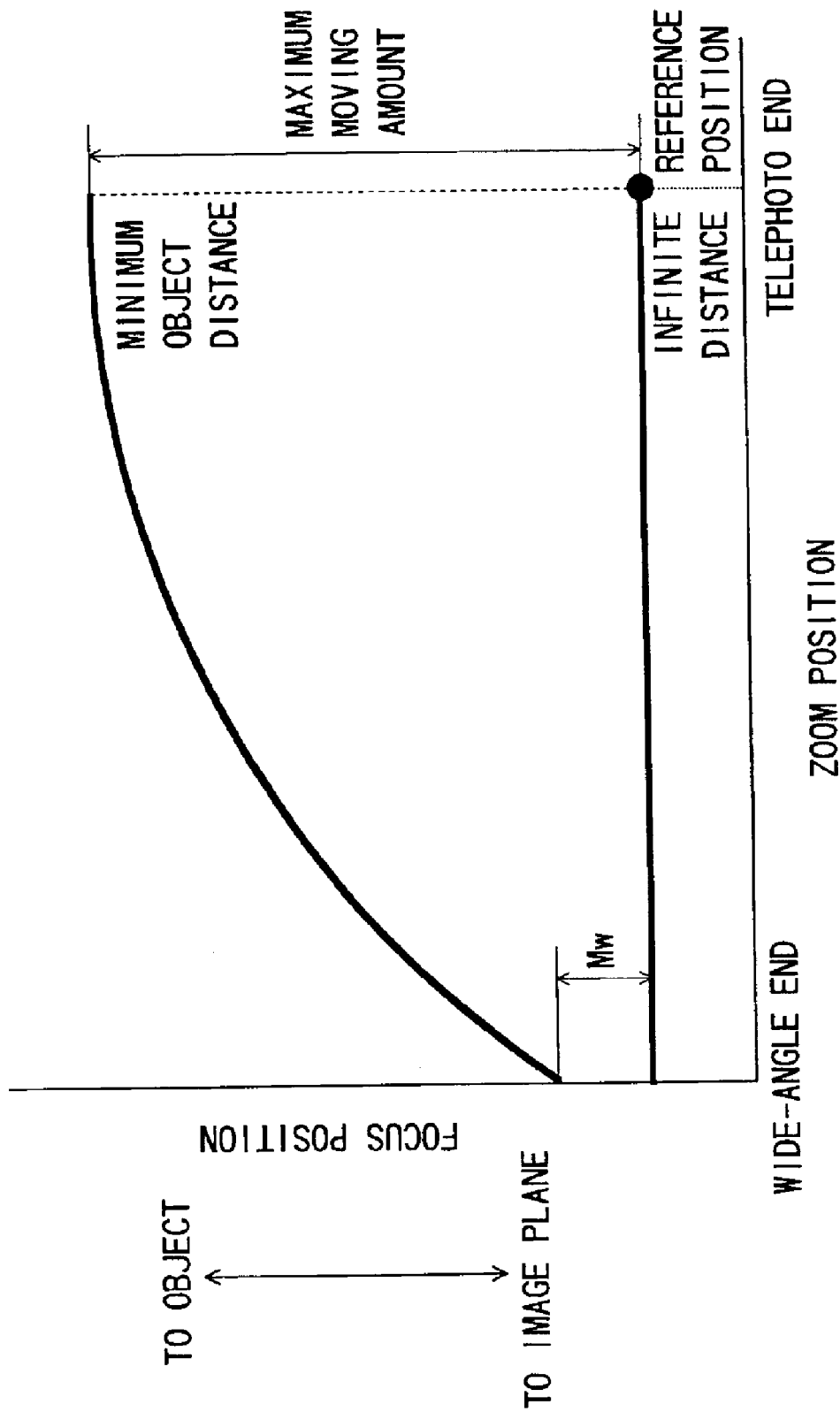
FIG. 6 shows exemplary zoom tracking curves used by a drive unit forming part of the image-taking system of Embodiment 2.

FIG. 6 schematically shows the zoom tracking curve data. The horizontal axis in FIG. 6 represents the position of the variator lens unit 203 (the zoom position), while the vertical axis represents the position of the focus lens unit 205 (the focus position). FIG. 6 shows data at the minimum object distance and data at the infinite distance where the zoom lens can achieve focusing.

The relationship among the zoom position and the object distance and the focus position represented by the zoom tracking curve data is the same at any camera on which the zoom lens 201 is mounted. However, when the zoom tracking curve data is used to actually perform control for maintaining an in-focus state in response to varied magnification in the zoom lens mounted on a particular camera, the zoom tracking curve data needs to be adapted to the flange focal distance of that camera.

In addition, the positional relationship between the position of the focus lens unit 205 corresponding to the position serving as a reference in the zoom tracking curve data (the base point) and the image-pickup surface (of a CCD or the like), that is, the flange focal distance, depends on the type of the camera on which the zoom lens is mounted, variations in individual products, factors of the environment in which the image-taking system is used such as temperature and humidity. For this reason, each time the zoom lens is mounted on a different camera, or each time images are taken in a different use environment, and immediately after the power is turned on, it is necessary to adjust the flange focal distance by determining a reference position of the focus lens unit 205 with respect to the base point in the zoom tracking curve data to make the zoom tracking curve data suitable for the flange focal distance of the camera.

To this end, in Embodiment 2, the driving mechanism realized by the cam or the like is used in the zoom lens in which the position of the variator lens unit 203 on the optical axis is established at the telephoto end. The focus lens unit 205 is driven at the telephoto end and a predetermined zoom position to achieve automatic focusing. Thus, the base point in the zoom tracking curve data is matched to the reference position of the focus lens unit 205.

Subsequently, the drive unit 217 is described. Reference numeral 209 shows a zoom motor which is activated in response to a drive signal from the lens controller 212 to drive the zoom driving mechanism 208 in the zoom lens 201. Reference numeral 211 shows a focus motor which is activated in response to a drive signal from the lens controller 212 to drive the focus driving mechanism 218 in the zoom lens 201.

The drive unit 217 has a zoom position detector 219 such as an encoder or a potentiometer which is connected to the zoom driving mechanism 208 to detect the driving position of the zoom driving mechanism 208 (that is, the zoom position). The lens controller 212 controls the focus motor 211 based on a detection signal from the zoom position detector 219 and the zoom tracking curve data. In this manner, an in-focus state is automatically maintained over the entire zoom range. The drive unit 217 also has a focus position detector 220 such as an encoder or a photosensor which is connected to the focus driving mechanism 218 to detect the driving position of the focus driving mechanism 218 (that is, the position of the focus lens unit 205).

Reference numeral 210 shows a diaphragm driving circuit which drives the diaphragm unit 204 in the zoom lens 201 in response to a driving signal from the lens controller 212.

Reference numeral 213 shows a flange focal distance adjustment switch which is operated by a user to give an instruction to perform flange focal distance adjustment operation. An operation signal from the switch 213 is input to the lens controller 212.

The flange focal distance adjustment is performed in the image-taking system 216 with the following procedure.

(1) First, the image-taking system 216 is disposed such that it faces a high-contrast object (a substance) such as a Siemens star chart and it is placed at an arbitrary distance from the object where focusing can be achieved over the entire zoom range of the zoom lens 201.

(2) The diaphragm unit 204 is set to the full aperture. This causes a small depth of focus to allow accurate flange focal distance adjustment for enhancing the accuracy of automatic focusing. In addition, the variator lens unit 203 is disposed at the telephoto end.

(2)' At this point, the lens unit 202 is fixed at a predetermined position when the lens unit 202 is movable for manual focusing. This can reduce a burden on an operator because of the simpler operation as compared with the conventional flange focal distance adjustment realized by several repetitive focusing actions with the lens unit 202 at the telephoto end and with the focus lens unit 205 at the wide-angle end.

(3) The focus lens unit 205 is driven by automatic focusing control to bring the object into focus. The position of the focus lens unit 205 at this point (the in-focus position) is stored in the data memory 212a or another memory, not shown.

(4) Next, the variator lens unit 203 is placed at a predetermined zoom position (focal length position) which is previously determined arbitrarily for flange focal distance adjustment other than the telephoto end and the wide-angle end.

In a case where the variator lens unit 203 is driven by a DC motor, the variator lens unit 203 is driven until the zoom position detector 219 (the potentiometer) detects the position of the variator lens unit 203 corresponding to the predetermined zoom position. In a case where the variator lens unit 203 is drive by a stepping motor, the variator lens unit 203 is driven from the telephoto end until the number of driving pulses provided for the stepping motor or an output from the zoom position detector 219 (the encoder) reaches the number of pulses corresponding to the predetermined zoom position.

When the variator lens unit 203 reaches the predetermined zoom position, the focus lens unit 205 is driven through automatic focusing control to bring the object into focus. The position of the focus lens unit 205 (the in-focus position) at this point is stored in the data memory 212a or the other memory.

(5) The difference between the in-focus position stored at the step (3) and the in-focus position stored at the step (4) is calculated. The difference is relied on to determine a reference position for subsequently controlling the position of the focus lens unit 205 with the zoom tracking curve data. The reference position is stored in the data memory 212a or the other memory. In this manner, the reference position setting or the flange focal distance adjustment is completed. The method of determining the reference position of the focus lens unit 205 based on the difference between the in-focus positions is described later.

The steps (2) to (5) can be automatically performed by the lens controller 212 upon reception of an operation signal of the flange focal distance adjustment switch 213.

Alternatively, after a user performs the steps (1) and (2) (and the step (2)'), the lens controller 212 may automatically perform the steps (3) to (5) upon reception of an operation signal of the flange focal distance adjustment switch 213.

The lens controller 212 may automatically perform steps (2) to (5) when the power is turned on.

Alternatively, whether a flange focal distance has been adjusted or not may be automatically checked when the power is turned on, and the flange focal distance may be automatically adjusted only if a displacement is detected.

In the steps (3) and (4), the lens controller 212 may receive an image-pickup signal from the image-pickup device 207 through the camera controller 215 to determine whether or not focusing is achieved by using the received image-pickup device through a so-called contrast detection method (a television AF method) or a phase difference detection method. The determination result is relied on to detect the in-focus position of the focus lens unit 205. Alternatively, the lens controller 212 may receive the result of focusing determination performed by the camera controller 215 to detect the in-focus position of the focus lens unit 205.

Figure 7:
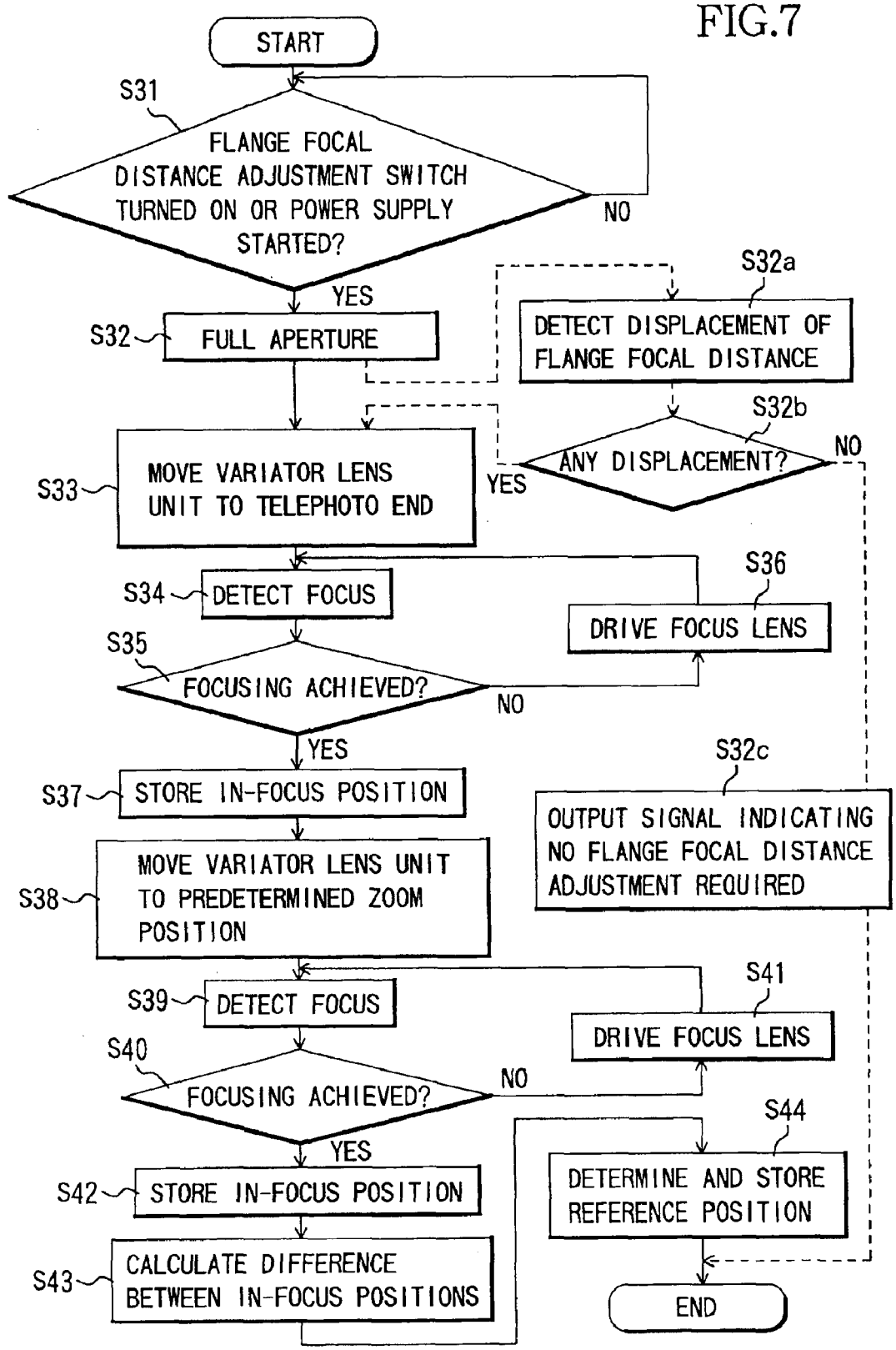
FIG. 7 is a flow chart showing control operation of flange focal distance adjustment of a zoom lens performed by the drive unit of Embodiment 2.

FIG. 7 is a flow chart showing the operation of the lens controller 212 when the lens controller 212 automatically performs the steps (2) and (5).

First, at step (abbreviated as "S" in FIG. 7) 31, the lens controller 212 determines whether or not an on-signal is input thereto from the flange focal distance adjustment switch 213 or whether or not power supply thereto is started from the camera 214 or from the outside power supply unit 250. If such an on-signal is input or power supply is started, the flow proceeds to step 32 and the lens controller 212 drives the diaphragm unit 204 to the full aperture (2).

If power supply is started, after step 32, the presence or absence of a displacement of the reference position (the flange focal distance) may be automatically detected as shown by a dotted line in FIG. 7 (step 32a). Specifically, the variator lens unit 203 is moved to the wide-angle end, and the focus lens unit 205 is moved to a reference position determined in the preceding adjustment and stored in the data memory 212a or the other memory. If a video signal of an arbitrary object has a signal strength smaller than a predetermined threshold, focusing operation is performed. When the focusing operation results in a higher signal strength, it is determined that the reference position is displaced from the position stored previously (step 32b), the flow proceeds to step 33. When the focusing operation does not result in a higher signal strength, the lens controller 212 outputs a signal for a display indicating that no flange focal distance adjustment is required (step 32c).

Next, at step 33, the lens controller 212 drives the zoom motor 209 to move the variator lens unit 203 to the telephoto end (2).

Next, at step 34, the lens controller 212 performs detection of a focusing state (focus detection) of the image-taking optical system based on an image-pickup signal received from the camera controller 215 through the contrast detection method or the like (3). In the case of the contrast detection method, the lens controller 212 extracts high-frequency components of the image-pickup signal and repeatedly moves the focus lens unit 205 by driving the focus motor 211 and detects focus until the level of the extracted high-frequency components reaches the maximum (until it is determined that focusing is achieved at step 35).

In the case of the phase difference detection method, the lens controller 212 compares two image-pickup signals produced by taking images of the same portion of the object to derive a defocus amount from the phase difference between the two images presented by the image-pickup signals. If the defocus amount is out of an in-focus range (it is determined that focusing is not achieved at step 35), the flow proceeds to step 36. The lens controller 212 calculates the position of the focus lens unit 205 where focusing is achieved (the driving amount of the focus motor 211) to drive the focus lens unit 205.

If it is determined that focusing is achieved at step 35, the flow proceeds to step 37. The lens controller 212 detects the position of the focus lens unit 205 at this point (the driving position of the focus driving mechanism 218) by the focus position detector 220 described above and stores the detected position in the data memory 212a or the other memory.

Next, at step 38, the lens controller 212 drives the zoom motor 209 to move the variator lens unit 203 to the aforementioned predetermined zoom position (4).

Next, at step 39, the lens controller 212 performs detection of a focusing state (focus detection) of the image-taking optical system based on an image-pickup signal received from the camera controller 215 through the contrast detection method or the phase difference detection method (4). If it is determined that focusing is not achieved at step 40, the lens controller 212 drives the focus lens unit 205 (step 41) to again perform focus detection (step 39).

If it is determined that focusing is achieved at step 40, the flow proceeds to step 42. The lens controller 212 detects the position of the focus lens unit 205 at this point (the driving position of the focus driving mechanism 218) by the focus position detector 220 described above and stores the detected position in the data memory 212a or the other memory.

Next, at step 43, the lens controller 212 calculates the difference between the in-focus position of the focus lens unit 205 at the telephoto end stored at step 37 and the in-focus position of the focus lens unit 205 at the predetermined zoom position other than the telephoto end stored at step 42 (5).

At step 44, the lens controller 212 determines the reference position of the focus lens unit 205 based on the difference between the in-focus positions, and stores the determined reference position in the data memory 212a or the other memory.

In this event, the lens controller 212 may compare the reference position stored as the result of the preceding flange focal distance adjustment with the reference position newly obtained at step 44, and if a displacement is found between them, the lens controller 212 may automatically rewrite the reference position newly obtained at step 44 into the data memory 212a or the other memory, or a circuit may be provided to give an instruction to execute such a rewrite with a display or the like.

In the following, a specific example of the zoom lens to which the flange focal distance adjustment control described in Embodiment 2 is applicable is illustrated. The zoom lens in FIG. 5 can have a cross section as shown in FIG. 4 and a numerical example as shown in Table 1.

As described above, FIG. 6 shows the zoom tracking curves for use in controlling the focus lens unit 205 to achieve focusing over the entire zoom range when an object distance is at the infinite distance and at the minimum object distance. In Numerical Example 1, the minimum object distance at which focusing can be achieved over the entire zoom range is 432 mm from the front surface of the zoom lens.

As seen from FIG. 6, the moving range of the focus lens unit 205 (V) for achieving focusing at each object distance from the infinite distance to the minimum object distance is the smallest at the wide-angle end and the largest at the telephoto end. Thus, it can be said that an object distance at which focusing can be achieved at the telephoto end is an object distance at which focusing can be achieved over the entire zoom range.

When the closest object distance at which focusing can be achieved over the entire zoom range is defined as the minimum object distance, Embodiment 2 is extremely effective for an object at a distance falling within the range between the infinite distance and the minimum object distance. At an object distance out of the distance range, however, focusing cannot be achieved and the accuracy of flange focal distance adjustment is reduced.

It is thus desirable to determine whether or not an object placed at an arbitrary distance can be brought into focus at the telephoto end to decide the accuracy of flange focal distance adjustment. In addition, if focusing cannot be achieved, warning operation may be performed such as output or display of a signal indicating that flange focal distance adjustment cannot be performed.

As described in Embodiment 1, when the permissible circle of confusion of a camera (that is, of an image-pickup device) is represented by $\epsilon$, and the full F number at the wide-angle end is represented by F, the depth of focus $\delta$ is generally represented by:

$$\delta = \epsilon F$$

When the absolute value of sensitivity of the focus lens unit 205 (V) to a back focal distance is defined as s, a moving amount 1 of the focus lens unit 205 required to displace the back focal distance by the depth of focus δ is represented by:

$$m = \epsilon F / |s|$$

When a difference between the in-focus position of the focus lens unit 205 (V) for an object at the infinite distance and the in-focus position for an object at the minimum object distance is represented by Mw, a displacement of the reference position is recognized as an image blur at some object distances to require more accurate flange focal distance adjustment if the value 1 is smaller than the value |Mw|.

From the above, when the following condition is satisfied:

$$2\epsilon F / |s| \leq |Mw| \quad (2)$$

then the setting of the reference position in Embodiment 2 is especially effective.

The relationship between the values of the respective parameters in Numerical Example 1 and the expression (2) is the same as that shown in Table 2.

It can be seen from Table 2 that Numerical Example 1 satisfies the expression (2). In Numerical Example 1, more accurate flange focal distance adjustment can be realized according to Embodiment 2.

Next, the method of adjusting the flange focal distance is described specifically. In the image-taking system having the zoom lens in Embodiment 2, the in-focus position of the focus lens unit 205 (V) at the telephoto end for an arbitrary object is defined as an origin, by way of example. Table 5 shows the in-focus position at the predetermined zoom position f=90 mm, that is, the difference between the in-focus position at the telephoto end and the in-focus position at the predetermined zoom position, and the in-focus position at the infinite distance, that is, the distance to the reference position. For positive and negative signs, the positive sign indicates a position closer to the image plane.

TABLE 5

| IN-FOCUS POSITION AT F = 90 | REFERENCE POSITION |
|---|---|
| 3.138 | 9.888 |

(unit mm)

In Embodiment 2, the focus lens unit 205 (V) is driven by an actuator such as a DC motor or a stepping motor, and its minimum moving amount d is represented by:

$$\frac{1}{8} \leq d \leq 1 \quad (3)$$

where d represents the minimum moving amount of the focus lens unit 205 (V), and 1 preferably represents the moving amount of the focus lens unit 205 (V) required to change the back focal distance by an amount corresponding to the depth of focus.

If the expression (3) has the condition represented by d<⅛, the moving speed of the focus lens unit 205 (V) is inappropriately reduced over the entire driving range. On the other hand, if the expression (3) has the condition represented by 1<d, an image blur is recognized. In Embodiment 2, d is set to be equal to 1 and to 0.024 (d=1=0.024), and this is referred to as one step of the moving amount of the focus lens unit 205 (V).

The values in Table 5 are represented in steps in Table 6. That is, Table 6 shows the in-focus position of the focus lens unit 205 (V) at the predetermined zoom position f=90 mm when the in-focus position at the telephoto end for an arbitrary object is defined as the origin (the difference between the in-focus positions at the telephoto end and the predetermined zoom position), and the distance from the in-focus position at the telephoto end to the reference position, both in steps.

TABLE 6

| IN-FOCUS POSITION AT F = 90 | REFERENCE POSITION |
|---|---|
| 131 steps | 412 step |

Such a data table as shown in Table 6 including the number of steps representing the difference between the in-focus positions at the telephoto end and the predetermined zoom position in association with the number of steps representing the distance from the in-focus position at the telephoto end or at the predetermined zoom position to the reference position, is provided for each of a required number of object distances from the infinite distance to the minimum object distance. The data tables are previously stored in the data memory 212a or the other memory.

The lens controller 212 reads the data table including the number of steps representing the difference between the in-focus position at the telephoto end and the in-focus position at the predetermined zoom position calculated at step 43. Further, the lens controller 212 reads a reference position written in the table (the number of steps from the in-focus position at the telephoto end), and sets the read value as reference position data, and stores the value as the data memory 212a or the other memory.

Another method of adjusting the flange focal distance is to previously store data tables each including the number of steps representing the aforementioned difference between the in-focus positions in association with a zoom tracking curve (in the example of Table 6, a zoom tracking curve showing 131 steps as a difference between the in-focus positions at the telephoto end and the zoom position f=90 mm) in the data memory 212a or the other memory. The number of the stored data tables corresponds to the number of zoom tracking curves.

The lens controller 212 reads the data table including the number of steps representing the difference between the in-focus position at the telephoto end and the in-focus position at the predetermined zoom position calculated at step 43. Further, the lens controller 212 reads a zoom tracking curve written in the table, and obtains the number of steps representing the distance from the in-focus position at the telephoto end to the reference position in the zoom tracking curve. The lens controller 212 sets the value as reference position data and stores the value as the data memory 212a or the other memory.

Figure 8:
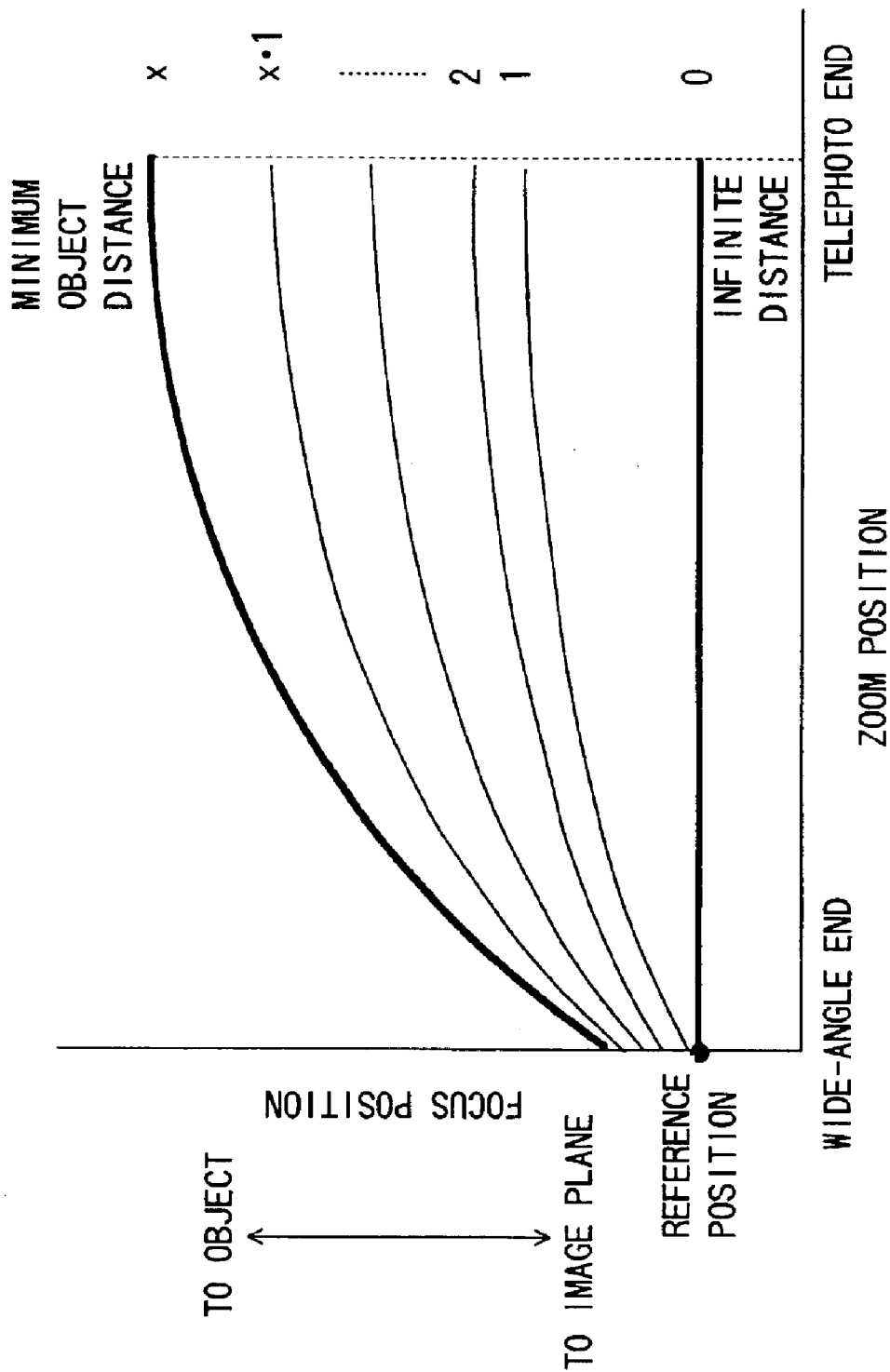
FIG. 8 shows zoom tracking curves for respective object distances stored in the drive unit of Embodiment 2.
Figure 9:
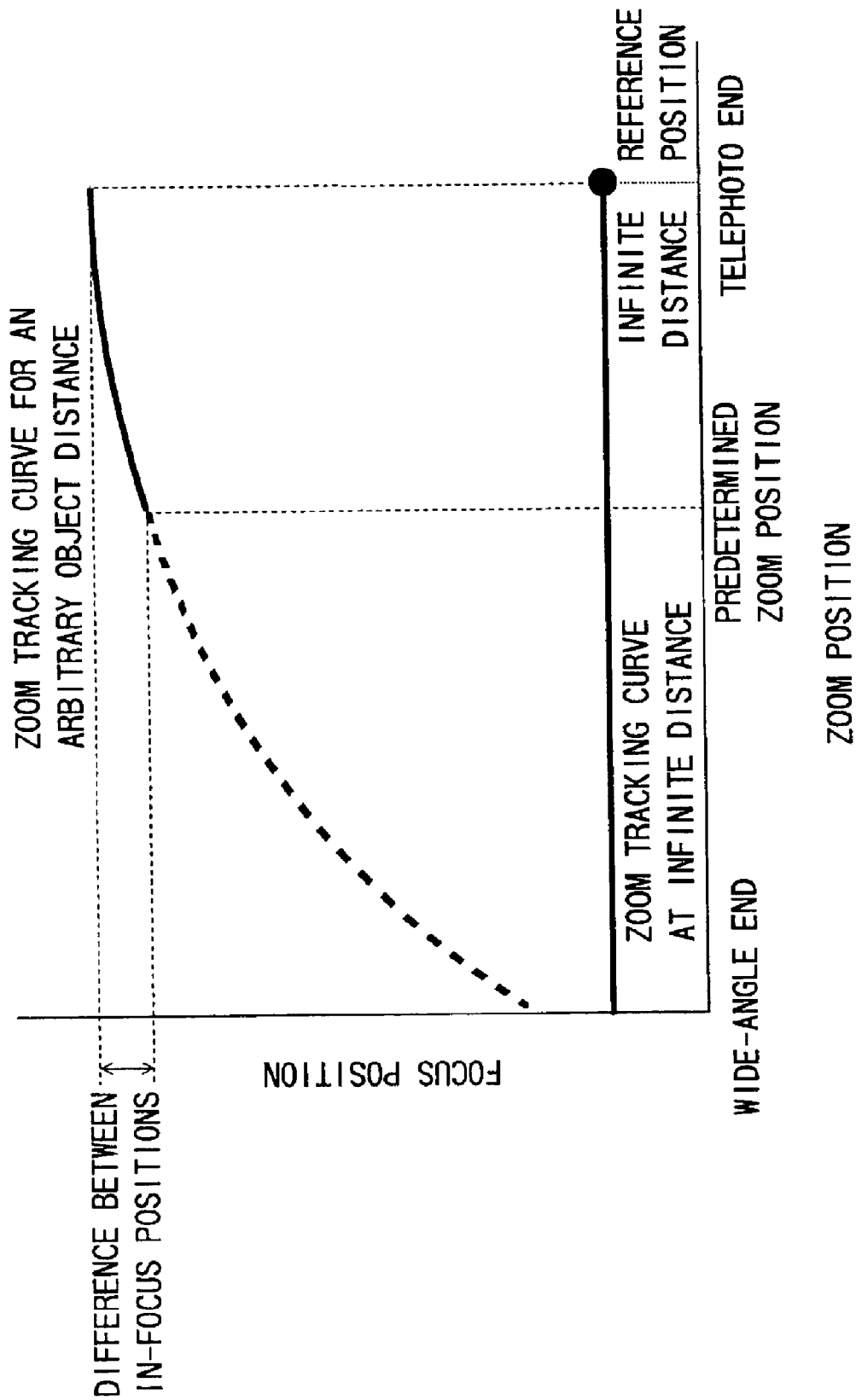
FIG. 9 shows the relationship between a zoom tracking curve and a reference position determined from a difference between in-focus positions in the drive unit of Embodiment 2.

FIG. 8 shows previously provided x zoom tracking curves between the infinite distance and the minimum object distance. FIG. 9 shows the relationship between the reference position and one of the x zoom tracking curves selected on the basis of the number of steps representing the aforementioned difference between the in-focus positions.

The reference position determined as described above is stored in the data memory 212a or the other memory, to adjust the flange focal distance.

As seen from the zoom tracking curves of the infinite distance shown in FIGS. 8 and 9, the focus lens unit is not moved ideally on the optical axis from the wide-angle end to the telephoto end at the infinite distance. However, when the zoom tracking curve of the infinite distance is not a straight line due to a manufacturing error of the zoom lens or the like (when the focus lens unit is moved on the optical axis from the wide-angle end to the telephoto end at the infinite distance), the data in the previously stored data tables including the number of steps representing the difference between the in-focus positions and the number of steps representing the distance from the in-focus position at the telephoto end to the reference position or the data in zoom tracking curves may be corrected, and the corrected data may be newly stored in the data memory 212a or the other memory.

Embodiment 3

Embodiment 2 has been described for the case where the reference position is determined by using the difference between the in-focus positions at the telephoto end and the predetermined zoom position other than the telephoto end. Alternatively, the reference position may be determined by using a difference between in-focus positions at two predetermined zoom positions other than the telephoto end.

For setting the two predetermined zoom positions, it is preferable to select a zoom position on the telephoto side where the focus lens unit V is moved over a large distance per unit focal length.

By way of example, the in-focus position of the focus lens unit 205 (V) at a first predetermined zoom position f=90 mm for an arbitrary object is defined as an origin. Table 7 shows the in-focus position at a second predetermined zoom position f=40 mm, that is, the difference between the in-focus positions at the first and second predetermined zoom positions, and the in-focus position at the infinite distance, that is, the distance to the reference position. For positive and negative signs, the positive sign indicates a position closer to the image plane.

TABLE 7

| IN-FOCUS POSITION AT F = 40 | REFERENCE POSITION |
| --- | --- |
| 5.140 | 6.750 |

(unit mm)

The values in Table 7 are represented in steps of moving amount of the focus lens unit in Table 8. That is, Table 8 shows the in-focus position of the focus lens unit V at the second predetermined zoom position f=40 mm (the difference between the in-focus positions at the first and second predetermined zoom positions) when the in-focus position at the first predetermined zoom position f=90 mm for an arbitrary object is defined as the origin, and the distance from the in-focus position at the first predetermined zoom position and the reference position, both in steps.

Similarly to Embodiment 2, one step is defined as d equal to 1 and to 0.024 (d=1=0.024) in Embodiment 3. For positive and negative signs, the positive sign indicates a position closer to the image plane.

TABLE 8

| IN-FOCUS POSITION AT F = 40 | REFERENCE POSITION |
| --- | --- |
| 214 steps | 281 step |

Such a data table as shown in Table 8 including the number of steps representing the difference between the in-focus positions at the first and second predetermined zoom positions in association with the number of steps representing the distance from the first or second in-focus position to the reference position, is provided for each of a required number of object distances from the infinite distance to the minimum object distance. The data tables are previously stored in the data memory 212a or the other memory.

The data table including the number of steps representing the difference between the in-focus positions at the first and second predetermined zoom positions is read, the reference position written in the table (for example, the number of steps from the in-focus position at the first predetermined zoom position) is read, and the read position is determined as reference position data.

Another method is to previously store data tables each including the number of steps representing the difference between the in-focus positions at the first and second predetermined zoom positions in association with a zoom tracking curve in the data memory 212a or the other memory. The number of the stored data tables corresponds to the number of zoom tracking curves.

In this case, it is possible that the data table including the number of steps representing the difference between the in-focus positions at the first and second predetermined zoom positions is read, the zoom tracking curve written in the table is read. Further, the number of steps representing the distance from the first or second focusing position to the reference position in the zoom tracking curve is obtained, and the value is determined as reference position data.

Embodiment 4

Each of Embodiments 1 to 3 has been described for the case where the reference position is determined on the basis of the difference between the in-focus positions at the two predetermined zoom positions (including the wide-angle end and the telephoto end). However, it is possible that three or more predetermined zoom positions are set and the reference position is determined on the basis of the difference among the in-focus positions at the predetermined zoom positions. This can enhance the accuracy of flange focal distance adjustment.

Embodiment 5

Each of Embodiments 1 to 4 has been described for the case where the flange focal distance adjustment is performed when the lens controllers 112 or 212 receives the operation signal from the flange focal distance adjustment switch 113 or 213, or the supplied power. However, flange focal distance adjustment may be automatically performed when a displacement of the reference position (the flange focal distance) is detected while images are taken. Alternatively, a circuit may be provided to output a signal indicating that the flange focal distance is displaced.

For example, an arbitrary object at a finite distance is brought into focus at a zoom position on the telephoto side, and the camera performs zooming to the wide-angle side on the object along the zoom tracking curve. In this case, if the strength of the video signal is extremely reduced and a phenomenon recognized as an image blur repeatedly occurs, it is determined that the flange focal distance is displaced. A warning signal is issued or the flange focal distance is automatically adjusted. This makes it possible to realize an image-taking system which has the flange focal distance always adjusted.

While Embodiments 1 to 5 have been described for the zoom lens system of the type in which the drive unit serving as the control apparatus is mounted on the zoom lens, the present invention is applicable to a zoom lens system in which a zoom lens contains a control apparatus.

In addition, the present invention is applicable to an interchangeable zoom lens having an optical structure other than that of the zoom lens described in each of Embodiments 1 to 5.

As described above, according to Embodiments 1 to 5, the flange focal distance adjustment can be performed automatically and accurately with a simple structure by using an object at an arbitrary distance in the zoom lens of a rear focus type. The reference position is set (stored), that is, the flange focal distance adjustment is performed to subsequently control the position of the second lens unit with the in-focus position data. It is thus possible to accurately maintain the focusing state when magnification is varied.

It is possible that the lens controller determines whether or not focusing can be achieved for an object at a distance from the minimum object distance to the infinite distance at the telephoto end. When it is determined that focusing cannot be achieved, the object is out of the range of object distances where focusing can be achieved over the entire zoom range, so that appropriate flange focal distance adjustment cannot be performed with the object. In this manner, the flange focal distance adjustment can be accurately performed by determining whether or not focusing cannot be achieved as described above.

The flange focal distance adjustment switch 113 or 213 is provided as an operation member for instructing the lens controller to perform the setting operation of the reference position (that is, the flange focal distance adjustment). Thus, a user can perform the flange focal distance adjustment at an arbitrary point in time.

In addition, upon reception of the image-pickup signal from the camera, the lens controller detects the focusing state of the zoom lens based on the image-pickup signal and determines whether or not the focus lens unit is at the in-focus position. It is thus possible to complete the setting operation of the reference position in the drive unit serving as the control apparatus.

While each of Embodiments 1 to 5 has been described for the case where the lens controller determines whether or not the focusing is achieved on the basis of the image-pickup signal received from the camera, the camera (camera controller) may perform such focusing determination and transmits a signal indicating the determination result to the lens controller.

While preferred embodiments have been described, it is to be understood that modification and variation of the present invention may be made without departing from the scope of the following claims.

What is claimed is:

1. A control apparatus controlling a zoom lens including, in order from an object side, a first lens unit which moves for varying the magnification, a light amount adjusting unit which adjusts a light amount, and a second lens unit which moves for focusing, the control apparatus comprising:

a memory which stores in-focus position data of the second lens unit with respect to a position of the first lens unit; and a controller which controls a position of the second lens unit with respect to a position of the first lens unit based on the in-focus position data, wherein the controller sets a reference position of the second lens unit for position control of the second lens unit with the in-focus position data based on a difference between an in-focus position of the second lens unit for an object at anywhere from a minimum object distance to an infinite distance when the first lens unit is located at a wide-angle end and an in-focus position of the second lens unit for the object when the first lens unit is located at a predetermined focal length position other than the wide-angle end, and the zoom lens satisfies the following condition:

$$2\epsilon F/|s| \leq |Mw|$$

where $\epsilon$ represents a permissible circle of confusion of the camera, F represents a full F number when the first lens unit is located at a wide-angle end, s represents amount of displacement of an image-forming position in the optical axis direction during movement of the second lens unit by a predetermined amount, and Mw represents a difference between in-focus positions of the second lens unit for an object at the infinite distance and for an object at the minimum distance, when the first lens unit is located at the wide-angle end.

2. The control apparatus according to claim 1, wherein the memory stores data for determining the reference position based on the difference between the in-focus positions in accordance with a distance to the object, and the controller sets the reference position with the data.

3. The control apparatus according to claim 1, wherein the in-focus position data is zoom tracking data which represents a moving track of the second lens unit for realizing the same image-forming performance at the same object distance regardless of movement of the first lens unit, the memory stores a plurality of the zoom tracking data for object distances, and the controller sets the reference position as a base point of one of the plurality of zoom tracking data based on the difference in the in-focus positions of the second lens unit.

4. The control apparatus according to claim 1, wherein the controller performs setting operation of the reference position when power supply thereto is started from the camera or from the outside.

5. The control apparatus according to claim 1, wherein the controller detects the presence or absence of a change in the reference position while images are taken, and when any change is detected, the controller performs new setting operation of the reference position.

6. A control apparatus controlling a zoom lens including, in order from an object side, a first lens unit which moves for varying the magnification, a light amount adjusting unit which adjusts a light amount, and a second lens unit which moves for focusing, the control apparatus comprising:

a memory which stores in-focus position data of the second lens unit with respect to a position of the first lens unit; and a controller which controls a position of the second lens unit with respect to a position of the first lens unit based on the in-focus position data, wherein the controller sets a reference position of the second lens unit for position control of the second lens unit with the in-focus position data based on a difference between in-focus positions of the second lens unit for an object at anywhere from a minimum object distance to an infinite distance when the first lens unit is located at least two predetermined focal length positions, and the zoom lens satisfies the following condition:

$$2\epsilon F/|s| \leq |Mw|$$

where $\epsilon$ represents a permissible circle of confusion of the camera, F represent a full F number when the first lens unit is located at the wide-angle end, s represents amount of displacement of an image-forming position in the optical axis direction during movement of the second lens unit by a predetermined amount, and Mw represents a difference between in-focus positions of the second lens unit for an object at the infinite distance and for an object at the minimum distance, when the first lens unit is located at the wide-angle end.

7. The control apparatus according to claim 6, wherein one of the two predetermined focal length positions is a telephoto end.

8. The control apparatus according to claim 6, wherein the memory stores data for determining the reference position based on the difference between the in-focus positions of the second lens unit in accordance with a distance to the object, and the controller sets the reference position with the data.

9. The control apparatus according to claim 6, wherein the in-focus position data is zoom tracking data which represents a moving track of the second lens unit for realizing the same image-forming performance at the same object distance regardless of movement of the first lens unit, the memory stores a plurality of the zoom tracking data for object distances, and the controller selects one of the plurality of zoom tracking data based on the difference in the in-focus positions of the second lens unit and sets the reference position from the selected zoom tracking data.

10. The control apparatus according to claim 6, wherein the controller performs setting operation of the reference position when power supply thereto is started from the camera or from the outside.

11. The control apparatus according to claim 6, wherein the controller detects the presence or absence of a change in the reference position while an image is taken, and when any change is detected, the controller performs new setting operation of the reference position.

12. A zoom lens system comprising:

a zoom lens including, in order from an object side, a first lens unit which moves for varying the magnification, a light amount adjusting unit which adjusts a light amount, and a second lens unit which moves for focusing; and the control apparatus according to claim 1.

13. A zoom lens system comprising:

a zoom lens including, in order from an object side, a first lens unit which moves for varying the magnification, a light amount adjusting unit which adjusts a light amount, and a second lens unit which moves for focusing; and the control apparatus according to claim 6.

14. An image-taking system comprising:

the zoom lens system according to claim 12; and a camera on which the zoom lens system is mounted and which takes an object image formed by the zoom lens.

15. An image-taking system comprising:

the zoom lens system according to claim 13; and a camera on which the zoom lens system is mounted and which takes an object image formed by the zoom lens.

* * * * *